R. H. AVERY.
Reel for Corn-Planter Check-Row Wires or Cords.
No. 222,854.   Patented Dec. 23, 1879.
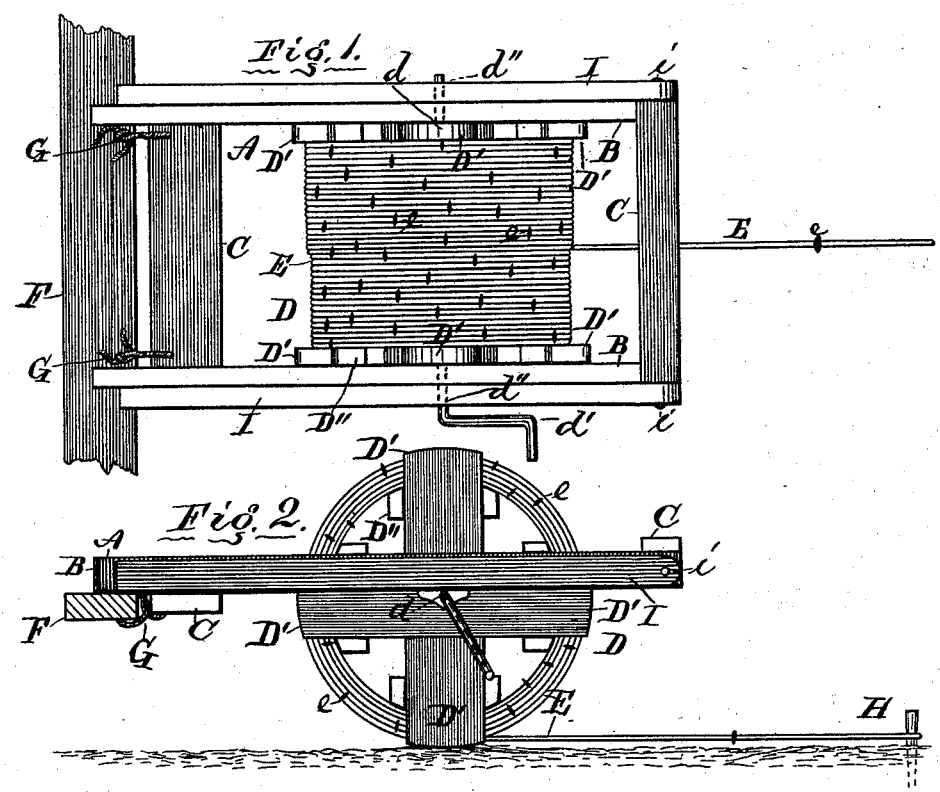
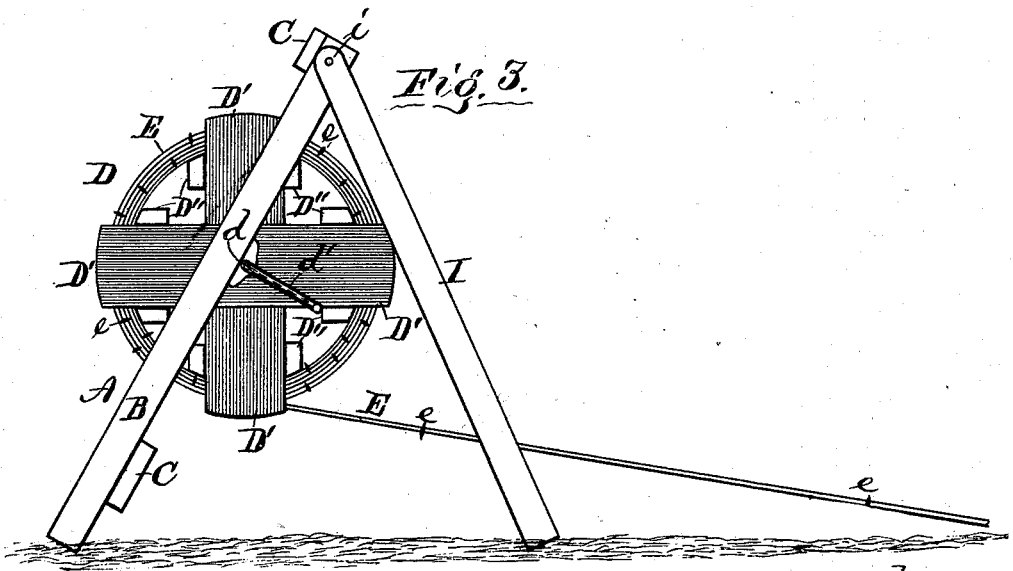

UNITED STATES PATENT OFFICE.

ROBERT H. AVERY, OF GALESBURG, ILLINOIS, ASSIGNOR OF ONE-HALF OF HIS RIGHT TO CYRUS M. AVERY, OF SAME PLACE.

IMPROVEMENT IN REELS FOR CORN-PLANTER CHECK-ROW WIRES OR CORDS.

Specification forming part of Letters Patent No. 222,854, dated December 23, 1879; application filed July 12, 1879.

*To all whom it may concern:*

Be it known that I, ROBERT H. AVERY, of Galesburg, in the county of Knox and State of Illinois, have invented certain new and useful Improvements in Reels for Corn-Planter Check-Row Wires or Cords; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a top-plan view of a construction showing my invention. Fig. 2 is a side elevation of the device in position for laying the check-row wire or cord. Fig. 3 is a side elevation of the device in position for spooling the wire or cord.

This invention relates to devices for laying and stretching check-row wires or cords across the field, to be used for actuating the seed-dropping devices of corn-planters, and also for winding the check-row wire or cord on a spool or reel when desired to remove it from the field.

The invention consists in a reel journaled in a frame, by which it may be dragged across the field with the ends of the reel-arms on the ground, to regulate the rotary movement of the reel and secure proper tension of the check-row wire or cord as the reel is drawn across the field to unwind said wire or cord from the reel, to pay it out and lay it in position for operation on the planter.

The invention also consists in a reel journaled in a frame, which may be secured to the rear end of a corn-planter, to be drawn by and after the planter, with the ends of the reel-arms on the ground, to regulate the rotary movement of the reel and secure proper tension of the check-row wire or cord.

The invention further consists in a reel adapted for use in laying a check-row wire or cord by dragging it with the reel-arms on the ground, with arms or braces by which the reel-frame can be supported in position for winding said wire or cord on the reel, said braces being hinged to the reel-frame and adapted to be turned upward on the projecting ends of the reel-shaft to support the braces when paying out the wire or cord, and downward to form braces for use in coiling the wire or cord; and it further consists in constructions and combinations hereinafter described, and set forth in the claims hereto annexed.

Referring to the drawings by letters, A represents a frame, formed of side bars, B B, connected by transverse bars C C. D is a reel or spool, with a central shaft, $d$, having a crank, $d'$, on one end, and a series of radial arms, D', near each of its ends, and horizontal bars or slats D''—an ordinary construction of reel, except that the ends $d''$ of the crank-shaft $d$ are extended, as shown at Fig. 1 of the drawings, for purposes hereinafter described. The shaft $d$ is journaled to the side bars, B, of the frame A, preferably somewhat in rear of the longitudinal center of said bars.

E is a corn-planter check-row wire or cord, of the class having knots or knobs $e$ for actuating the planter seed-slides.

F is a portion of the rear part of a corn-planting machine. G G are cords for securing the reel-frame A to the part of the planter F. H is a stake in the ground.

An arm, I, is pivoted or hinged at one end, at $i$, to each side of the frame A, so that they can be turned up and rest upon the extended ends $d''$ of the shaft D as supports, as shown at Figs. 1 and 2 of the drawings, or be turned down as braces, as shown at Fig. 3 of the drawings.

To lay the wire or cord E across the field in position for operation on a corn-planter, the frame A is preferably attached to the rear part, F, of the planter by the cords G, with the reel D in rear of the planter and its arms D' resting on the ground. The end of the wire or cord is attached in the ordinary manner to any suitable anchor, H. As the planter is drawn forward the wire or cord E will be paid out, and as the radial length of the arms D' is greater than the circumference of the coil of wire on the reel, the result will be that the arms D' will have to slip in the soil slightly, but will be held in the soil sufficiently to give the proper tension to the wire or cord as it is paid out, and thus prevent adhering of the wire to the unwound portion on the reel, causing sudden unwinding at intervals, and producing lack of tension, as is the case when the reel is mounted on the corn-planter.

It will be seen, also, that as the machine progresses across the field the difference between the radial length of the arms D' and the diameter of the coiled wire on the reel will increase, and hence the draft on the paid-out wire be increased with its increasing length, as is necessary to preserve the required tension in a long check-row wire or cord.

The draft-animals may be hitched to the frame A to draw the reel across the field; but I prefer hitching to the planter, as it helps sustain the forward end of the frame A, and is at proper place after such use to commence planting.

When it is desired to re-coil the wire or rope E on the reel D, the arms I may be turned at an angle to the frame A and the device fixed, as shown at Fig. 3 of the drawings, at one side of the field. The wire or cord E being loosed from the anchors at its ends and one end attached to the reel D, the crank $d''$ may be taken hold of to re-coil the wire or cord on the reel in the evident manner.

I am aware that hose-reels have heretofore been used in connection with a frame to lay down the hose, and which can be reversed or turned bottom side up in order to re-coil it again; and I am also aware that reels have heretofore been used for laying down the wires or cords intended for use on check-row corn-planters. Therefore I do not claim such; but

What I claim as new is—

1. In combination with a check-row wire or cord, E, anchor H, and reel D, having radial arms D', or their equivalents, projecting beyond the wire or cord coiled upon the reel, a draft-frame, A, to which the reel is journaled, so that the draft-frame may be drawn across a field with the reel-arms D' on the ground, substantially as described, and for the purpose specified.

2. The reel D, having radial arms projecting beyond the wire or cord wound upon the reel, check-row wire or cord E, and frame A, to which said reel is journaled, in combination with the corn-planter F, to which the frame A is attached, so as to draw the reel after the planter, and with its radial arms or their equivalents on the ground, substantially as described, and for the purpose specified.

3. In combination with the frame A, to which the reel D, with a crank, $d'$, is journaled, and with the check-row wire or cord E, braces for supporting the frame A and reel while the reel is rotated to wind the wire or cord E thereon, said brace being hinged to the reel-frame, and adapted to be turned upward on the projecting ends of the reel-shaft to support them when paying out the wire or cord, and downward to form braces for use in coiling the wire or cord, substantially as and for the purpose specified.

In testimony that I claim the foregoing as my own I affix my signature in presence of two witnesses.

ROBERT H. AVERY.

Witnesses:
H. A. ALLEN,
P. R. RICHARDS.